Jan. 25, 1938.                J. G. SKINNER                2,106,665
                              FLANGE OILER
                         Filed June 22, 1936
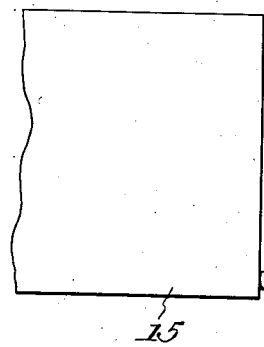
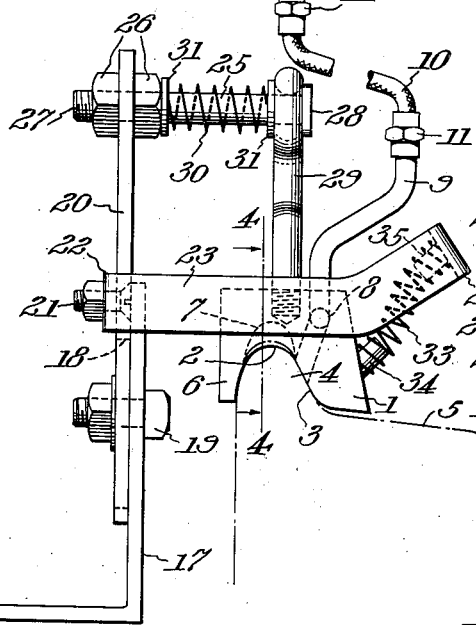
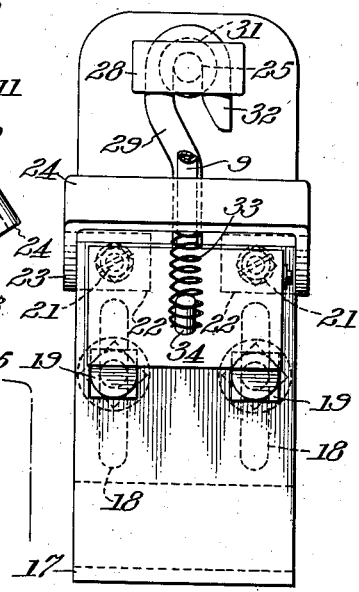
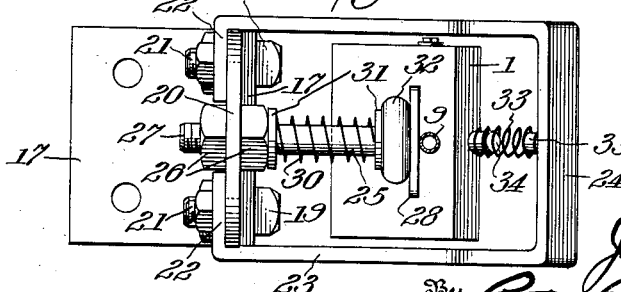
Inventor:
John G. Skinner,
By Potter, Pierce & Scheffler,
Attorneys.

Patented Jan. 25, 1938

2,106,665

UNITED STATES PATENT OFFICE 2,106,665

FLANGE OILER

John G. Skinner, Anaconda, Mont.

Application June 22, 1936, Serial No. 86,645

11 Claims. (Cl. 184—3)

This invention relates to flange oilers, and it has particular reference to oilers of the type adapted for lubrication of the flanges of the wheels of engines and other railway vehicles, with the objective that the oil may be most advantageously distributed upon the flanges, preferably adjacent to the junction of the flanges with the wheel treads, thereby not only effectively to lubricate the flanges of the wheels in an economical manner, thus minimizing wear of same, but also to distribute a measure of the lubricant employed upon the railway rails.

Flange oilers of various types have been provided heretofore, but the majority of them have characteristics of design and method of operation which are undesirable and which impair their efficiency, and one of the objects of the present invention is to remedy the defects and deficiencies of flange oilers of the known types.

One of the disadvantages of flange oilers heretofore proposed is that they are so mounted for cooperation with the wheel flanges that maximum efficiency in distribution of lubricant is impossible due, principally, to the fact that they are devoid of sufficient flexibility to permit the means by which the lubricant is applied to or distributed upon the wheel flanges to accommodate itself to variations in the movement of the flanges due to vibration, jolting, etc. of the wheels themselves, and to wear occasioned in the wheels and particularly in the flanges thereof as a result of continued use.

To overcome this objection the oiler of the present invention embodies features of mounting whereby the means through which the lubricant is applied to the wheel flange is capable of substantially free floating contact with the wheel flange and is thereby enabled closely to engage the wheel flange and thus efficiently and positively distribute the lubricant thereon as desired, regardless of movement of the wheel and despite the wear of the treads and flanges occurring through continued use.

The invention comprises a flange oiler including a lubricant applying and distributing element or shoe appropriately shaped for contact with the wheel flange and providing the means whereby lubricant may appropriately and effectively be fed to and distributed upon said flange, and means for supporting this shoe with respect to the wheel flange in such manner that the shoe is capable of appreciable radial, axial and circumferential movement with the wheel, thereby permitting the shoe effectively to contact the wheel flange during jolting, axial, lateral and rotative movement of the wheel, appropriate means being also provided for feeding lubricant to the shoe.

In the accompanying drawing illustrating one embodiment of the invention, in the several views of which like parts are similarly designated, Fig. 1 is a side view of the flange oiler of the invention shown in its application to a flanged wheel of conventional type;

Fig. 2 is a front view of the shoe and its mounting means;

Fig. 3 is a top plan view of parts illustrated in Fig. 2, and

Fig. 4 is a section of the shoe taken substantially in the plane of line 4—4 of Fig. 1.

As hereinbefore indicated, the lubricant-applying element or shoe 1 comprises a block of metal or other suitable wear-resisting material preferably recessed in its under face, as indicated at 2, to provide a face 3 appropriately shaped for relatively intimate contact with the outer face of the wheel flange 4 adjacent the junction of this face with the wheel tread 5, a complemental guide member 6 being provided for appropriate engagement with the inner face of the wheel flange 4. In order to accommodate the circumferential curvature of the flange 4 the shoe 1 is provided with a pocket 7 which, in addition to its function mentioned, provides a space free of contact with the wheel flange, thereby reducing friction of the shoe upon the flange.

The shoe 1 is longitudinally bored as indicated at 8 to provide a manifold for the reception and distribution of lubricant which may be conveyed to it by suitable means such as a pipe 9 connected by a flexible or other conduit 10 and unions 11 with a pipe 12, provided with a control valve 13 and sight feed 14, leading from a lubricant reservoir 15 mounted upon any appropriate part of the engine or other vehicle. Ducts 16, suitable in number effectively to feed and distribute the lubricant, provide lubricant passages between the manifold 8 and the face 3 of the shoe 1.

A bracket 17 secured to the frame or other suitable part of the engine or other vehicle adjacent the wheel provides a support for the flange oiler, and to this bracket is adjustably secured, as by means of a slot and bolt connection 18, 19, a plate 20 having secured thereto intermediate its ends, preferably by bolts 21 and ears 22, a yoke 23 of approximate U-shape having its closed end 24 vertically offset for a purpose hereinafter appearing.

Adjacent its upper end, the adjustable plate 20 carries an arm 25 longitudinally adjustable in the plate 20 by means of nuts 26 cooperating with the screw threaded end 27 of the arm 25 and with the opposite faces of the plate 20. The outwardly extending opposite end of the arm 25 is provided with a head 28 and carries a hook-shaped suspension member 29 normally maintained in contact with the head 28 and in substantially vertical position by a spring 30 pressing against washers 31. By reference to Fig. 2 it will be seen that the hook portion 32 of the member 29 is of elongated form, thus permitting a relatively extensive vertical movement thereof with respect to the arm 25 without disengagement of the same from the arm. The value of this connection will be apparent from the reference to the operation of the device which follows.

The laterally extending arms of the yoke 23 embrace the ends of the shoe 1 but do not contact therewith, thereby permitting a limited movement of the shoe circumferentially of the wheel. A spring 33 interposed between the outer face of the shoe 1 and the offset closed end 24 of the yoke and held in position by studs or the like 34 and 35, respectively, upon these parts tends normally to exert a pressure on the shoe in transverse and downward directions, thereby maintaining the face 3 of the shoe in correct wiping contact with the adjacent outer face of the flange 4 of the wheel.

In installing the flange oiler, it is preferable to adjust the plate 20 with respect to the bracket 17 so that the shoe 1 will be out of contact with the tread 5 of the wheel, as indicated in Fig. 1. This tends to prevent distribution of lubricant from the flange of the wheel to its tread, and at the same time makes it possible to accommodate the shoe to the flange during wear of the latter.

The operation of the flange oiler will be rather obvious from the foregoing description, but there are features in connection therewith which warrant special mention. The adjustment of the shoe 1 with respect to the wheel flange 4 is such that the face 3 of the shoe and the ducts 16 communicating through and terminating in this face will so contact the adjacent face of the wheel flange 4 that the lubricant will be most effectively distributed upon the flange to minimize wear of the same and of the contacting portion of the railway rail. In other words, the lubricant will be distributed at or adjacent to the root of the flange, that is to say approximately at the junction of the flange with the wheel tread.

Furthermore, in view of the manner in which the shoe 1 is supported with relation to the wheel flange, the shoe may be said to float with respect thereto, while at the same time having its contacting face 3 pressed into engagement with the adjacent face of the flange by means of the spring 33. Obviously, with this arrangement, the shoe may move vertically to adapt itself to radial movement of the wheel, it may move axially with the wheel, and it may move circumferentially with the wheel within the limits prescribed by the side arms of the yoke 23, and all of these movements are accommodated without imposing any undue strain upon the parts. Moreover, vertical movement of the shoe, that is to say its movement radially with the wheel, may be relatively extended due to the elongated nature of the hook portion 32 of the suspension member 29, without causing disengagement of this hook portion from the arm 25.

Further, it will be noted that the suspension member 29, the arm 25, the spring 30 or the spring 33, or a number of these parts, separately or simultaneously, may become disconnected or be lost, without seriously impairing the operation of the device, it being apparent that the shoe 1 cannot escape from the wheel flange 4 except by extended vertical movement, because of the embracing nature of the yoke 23 with respect thereto, and as long as the lubricant feed line comprising the parts 9, 10 and 11 is intact, no such disturbing vertical movement is likely to take place.

It will be apparent too that the parts of the device are so designed and assembled that disassembly for purposes of replacement and repair is facilitated.

The device is simple in its construction and mode of operation, has few parts, is easy to install and to service, can be furnished cheaply, is very flexible in the sense of its adaptation to a particular installation, and in operation is not only efficient but economical, the last being due mainly to the fact that the lubricant is applied in desired quantity and at a point adapted to insure the most effective results.

Various changes and modifications are of course to be considered within the spirit of the invention and the scope of the claims.

I claim:

1. In a flange oiler, a lubricant-applying element and means for mounting said element with respect to the flange of a wheel, said mounting means including a bracket appropriately supported adjacent the wheel, an arm supported by said bracket and arranged for vertical adjustment with respect to said wheel, a suspension member carried by said arm and movable with respect thereto, said suspension member carrying said lubricant-applying element, and means associated with said bracket and including resilient means cooperating with said lubricant-applying element for normally maintaining the latter in cooperative relation to the wheel flange, said mounting means serving to support said lubricant-applying element in such manner that said element may accommodate itself within predetermined limits to axial, radial and circumferential movements of said wheel.

2. In a flange oiler, a lubricant-applying element and means for mounting said element with respect to the flange of a wheel, said mounting means including a bracket appropriately supported adjacent the wheel, a member carried by and vertically adjustable with respect to said bracket, an arm carried by said member and thereby supported for vertical adjustment with respect to said wheel, a suspension member carried by said arm and movable longitudinally and vertically with respect thereto, said suspension member carrying said lubricant-applying element, a yoke carried by said adjustable member and embracing said lubricant-applying element, and resilient means interposed between said yoke and said lubricant-applying element and serving to maintain said element normally in cooperative relation to the wheel flange, said mounting means permitting movement of said lubricant-applying element whereby the latter may accommodate itself within predetermined limits to axial, radial and circumferential movements of said wheel.

3. In a flange oiler, a lubricant-applying element and means for mounting said element with respect to the flange of a wheel, said mounting means including a bracket appropriately supported adjacent the wheel, an arm supported by said bracket and arranged for vertical adjustment with respect to said wheel, a suspension member carried by said arm and movable with respect thereto, said suspension member carrying said lubricant-applying element, a yoke member supported by said bracket and embracing said lubricant-applying element, said yoke member having a part upwardly offset with respect to said lubricant-applying element, and resilient means interposed between said upwardly offset part and said lubricant-applying element and tending to exert a combined downward and lateral pressure against said element to maintain the latter normally in cooperative relation to the wheel flange, said mounting means serving to accommodate said lubricant-applying element to axial, radial and circumferential movements of said wheel.

4. In a flange oiler, a lubricant-applying element and means for mounting said element with respect to the flange of a wheel, said mounting means including a bracket appropriately supported adjacent the wheel, an arm supported by said bracket and arranged for vertical adjustment with respect to said wheel, said arm provided with a head, a suspension member having a hook-shaped end engaging said arm, resilient means for maintaining said hook-shaped end normally in engagement with the head of said arm, said suspension member being movable axially and vertically with respect to said arm and carrying said lubricant-applying element, and means associated with said bracket and cooperating with said lubricant-applying element for maintaining the latter normally in cooperative relation to the wheel flange, said mounting means serving to support said lubricant-applying element in such manner that said element may accommodate itself within predetermined limits to axial, radial and circumferential movements of said wheel.

5. In a flange oiler, a lubricant-applying shoe having a face shaped for cooperation with a wheel flange, lubricant feeding means terminating in said face, means for supplying lubricant to said feeding means in appropriately controlled amount, a bracket mounted adjacent the wheel, a member adjustably mounted upon said bracket, an arm carried by said member, a supporting element carrying said shoe and having a hook end engaging said arm, resilient means for maintaining said supporting element normally in predetermined relation to said arm, a yoke carried by said adjustable member and embracing said shoe, and resilient means interposed between said yoke and shoe and operating to maintain the said face of the shoe in contact with said wheel flange, the mounting of said shoe with respect to said flange permitting movement of the shoe to accommodate the same to axial, radial and circumferential movements of said wheel.

6. A wheel flange lubricator comprising a supporting member above the wheel, a lubricant applicator overlying the flange of the wheel adapted to supply the lubricant to the side of the flange adjacent the root of the same, means for supplying lubricant to said applicator, means for applying a combined lateral and downward pressure on the applicator against the side of the flange, means for suspending said applicator from said supporting member to float on the wheel and permit, within operable limits, movement of said applicator on said flange.

7. A wheel flange lubricator comprising a horizontal supporting member above the wheel and substantially parallel with the axis of the latter, a lubricant applicator overlying the flange of the wheel, means for supplying lubricant to said applicator, means for suspending said applicator from said supporting member to float on the wheel and permit, within operable limits, movement of said applicator, said suspending means being transversely rockable with respect to its said supporting member, means for yieldingly forcing said suspending means along said horizontal supporting member toward a normal operating position above the wheel flange, and a stop defining the limit of the movement of said suspending means along said supporting member.

8. A wheel flange lubricator comprising a supporting member, a lubricant applicator overlying the flange of the wheel, means for suspending said applicator from said supporting member to float on the wheel, and a guard embracing said applicator but normally out of contact therewith for maintaining said applicator on said flange in case of failure of said supporting member or said suspending means.

9. A wheel flange lubricator comprising a supporting member, a lubricant applicator overlying the flange of the wheel, means for suspending said applicator from said supporting member to float on the wheel and permit, within operable limits, movement of said applicator, and a yoke shaped guard embracing said applicator but normally out of contact therewith for maintaining said applicator on said flange in case of failure of said supporting member or said suspending means, and resilient means between a portion of said yoke and said applicator for applying a combined radial and downward pressure on the applicator against the side of the flange.

10. A wheel flange lubricator comprising a lubricant applicator, means for supporting said applicator on the flange substantially in floating relation thereto, means for applying pressure transversely and downwardly on said applicator to maintain the latter in wiping contact with the face of the flange, and means adjacent said applicator but normally out of contact therewith for limiting the lateral movement of the applicator while accommodating the same, within operable limits, to movement with respect to the wheel.

11. A wheel flange lubricator comprising a supporting member, a lubricant applicator in juxtaposition to the flange of the wheel, means for suspending said applicator from said supporting member to engage the wheel, and a guard embracing said applicator for maintaining the same on said flange in case of failure of said supporting member or said suspending means.

JOHN G. SKINNER.